United States Patent [19]

Dietz et al.

[11] Patent Number: 5,368,641
[45] Date of Patent: Nov. 29, 1994

[54] MODIFIED 2,9-DIMETHYLQUINACRIDONE PIGMENTS, PROCESS FOR THEIR MANUFACTURE AND A METHOD FOR PIGMENTING OR LACQUER SYSTEMS WITH THESE PIGMENTS

[75] Inventors: Erwin Dietz, Kelkheim; Adolf Kroh, Selters, both of Germany

[73] Assignee: Hoechst AG, Frankfurt am, Germany

[21] Appl. No.: 995,354

[22] Filed: Dec. 22, 1992

Related U.S. Application Data

[63] Continuation of Ser. No. 414,754, Sep. 28, 1989, abandoned.

[30] Foreign Application Priority Data

Oct. 1, 1988 [DE] Germany ............................ 3833423

[51] Int. Cl.$^5$ .................................................. C09B 48/00
[52] U.S. Cl. ........................................ 106/495; 106/497; 106/23 H; 546/49; 546/56; 546/57; 546/103
[58] Field of Search .................. 106/497, 495, 23 H; 546/49, 56, 57, 103

[56] References Cited

U.S. PATENT DOCUMENTS

| 3,265,699 | 8/1966 | Jaffe | 106/497 |
|---|---|---|---|
| 3,386,843 | 6/1968 | Jaffe et al. | 106/495 |
| 4,217,265 | 8/1980 | Dietz et al. | 106/499 |
| 4,310,359 | 1/1982 | Ehashi et al. | 106/495 |
| 4,317,682 | 3/1982 | Katsura et al. | 106/493 |
| 4,400,515 | 8/1983 | Fuchs et al. | 106/497 |
| 4,451,564 | 5/1984 | Graser et al. | 106/497 |
| 4,455,173 | 6/1984 | Jaffe | 106/495 |
| 4,758,665 | 7/1988 | Spietschka et al. | 106/497 |
| 4,760,144 | 7/1988 | Jaffe | 106/497 |
| 4,857,646 | 7/1989 | Jaffe | 106/497 |
| 4,881,980 | 11/1989 | Dietz et al. | 106/497 |

FOREIGN PATENT DOCUMENTS

| 0009720 | 4/1980 | European Pat. Off. |
|---|---|---|
| 0069396 | 1/1983 | European Pat. Off. |
| 3031301 | 3/1981 | Germany |
| 3106906 | 1/1982 | Germany |
| 3838814 | 7/1989 | Germany |

*Primary Examiner*—Karl Group
*Assistant Examiner*—Scott L. Hertzog
*Attorney, Agent, or Firm*—Connolly and Hutz

[57] ABSTRACT

A process for the preparation of 2,9-dimethylquinacridone pigments or mixed crystal pigments or mixtures of 2,9-dimethylquinacridone and quinacridones which in the two outer fused benzene rings can be substituted, characterized by the form of their crystalline particles having an average ratio of length to width of <2:1 and an average particle size of <0.4 μm, by adding to the solution of 2,9-dimethylquinacridone before or during the finishing of the corresponding crude quinacridones of the quinacridones mentioned in water or solvent mixtures at temperatures from about 60° to about 200° C., in each case a compound of the general formula (I)

$$Q+A-Y]_n \qquad (I)$$

in an amount of about 1 to 20% by weight, in which Q is a quinacridone radical which is unsubstituted or substituted, Y is an —NR$^4$R$^5$ group or the radical of a five-, six- or seven-membered heterocycle which contains one to three hetero atoms and can be substituted, R and R' are hydrogen or alkyl, and R$^1$ to R$^5$ are hydrogen and/or alkyl or alkylene, and n is a number from 1 to 4, the pigments themselves thus prepared and their use for the pigmenting of natural or synthetic materials and of lacquer systems.

10 Claims, No Drawings

MODIFIED 2,9-DIMETHYLQUINACRIDONE PIGMENTS, PROCESS FOR THEIR MANUFACTURE AND A METHOD FOR PIGMENTING OR LACQUER SYSTEMS WITH THESE PIGMENTS

This application is a continuation of application Ser. No. 414,754, filed Sep. 28, 1989, now abandoned.

The invention relates to 2,9-dimethylquinacridone pigments or mixed crystal pigments or mixtures of 2,9-dimethylquinacridone and optionally substituted quinacridones which are characterized by the form of their crystalline particles which have an average ratio of length to width of <2:1 and an average particle size of <0.4 μm, to a process for their preparation and their use. The quinacridone pigments prepared according to the invention are distinguished by advantageous surface properties and advantageous properties for practical application.

The 2,9-dimethylquinacridone mixed crystal pigments according to the invention are based on mixed crystals which have the known lattice of 2,9-dimethylquinacridone.

The preparation of quinacridone pigments is known, for example from DE 1,261,106 by ring closure of 2,5-diphenylaminoterephthalic acid in acidic condensation agents, such as, for example, polyphosphoric acid, and conversion of the crude quinacridones obtained into the pigment form by means of a solvent treatment. In this method, the pigments have different forms of crystalline particles. Apart from square platelets or cubic particles, some of which have a very narrow range of particle sizes, needle- and rod-like particles are also formed, in particular in the case of 2,9-dimethylquinacridone pigments, the first-mentioned having a significantly better rheological behavior in the pigmenting of polymeric materials. Pigments whose crystalline particles are needle- or rod-like lead, for example when processed in lacquer systems, to difficulties in terms of viscosity and dispersibility and to coloristic shortcomings, such as, for example, with respect to gloss, flocculation and color strength.

To improve these unsatisfactory pigment properties, a series of measures are known which in many cases lead to a considerable lessening of these difficulties.

The preparation of quinacridone pigments by means of surface-active agents, such as, for example, alkylphenol polyglycol ether sulfonates, is known from German Patent 2,152,485 or, such as, for example, quaternary ammonium compounds, from European Patent 0,142,066. The addition of small amounts of quinacridonesulfonic acids or quinacridonesulfonic acid derivatives to quinacridone pigments is disclosed in U.S. Pat. No. 3,386,843.

U.S. Pat. No. 4,732,618 describes the preparation of quinacridone pigments by means of polymeric materials. European Patent 009,720, German Offenlegungsschrift 3,031,301, German Offenlegungsschrift 3,106,906 and German Offenlegungsschrift 3,743,619 disclose the addition of pigment derivatives, such as, for example, quinacridonecarboxamides, quinacridonesulfonamides or quinacridonemethyleneimidazoles, to the pigment, for example during the lacquer conditioning or its preparation, to improve these properties.

The addition of condensation products of quinacridones, phthalimides and formaldehyde to quinacridone pigments to improve the pigment properties has already been described several times. Thus, European Offenlegungsschrift 069,396 describes the addition of these types of condensation products for controlling the crystal growth.

In 2,9-dimethylquinacridone pigments which, as described above, have considerable rheological and coloristic shortcomings during the further processing, some of the abovementioned processes achieve a partial improvement of the rheological and coloristic properties. However, good rheology in combination with faultless coloristic properties in highly transparent coatings cannot be achieved by these methods.

It has now been found that 2,9-dimethylquinacridone pigments and mixed crystal pigments or mixtures of 2,9-dimethylquinacridone and quinacridones, which in the two outer fused benzene rings can be substituted by halogen atoms, such as, for example, fluorine or chlorine atoms, alkyl ($C_1$-$C_6$), alkoxy ($C_1$-$C_6$), $H_2N$—CO—, alkyl ($C_1$-$C_8$)—NH—CO— or

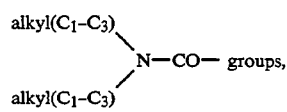

and are characterized by the form of their crystalline particles which have an average ratio of length to width of <2:1 and an average particle size of <0.4 μm and are distinguished by advantageous surface properties and advantageous properties for practical application, can be prepared by adding to the solution of 2,9-dimethylquinacridone or to the solution of 2,9-dimethylquinacridone together with the substituted or unsubstituted quinacridones in acidic solvents (such as, for example, concentrated sulfuric acids or trifluoroacetic acid) and/or during the hydrolysis of these acidic solutions at temperatures from about 0° to about 150° C., preferably about 20° to about 135° C., and/or before or during the finishing of the crude quinacridones of the quinacridones mentioned in water or solvent mixtures at temperatures from about 60° to about 200° C., preferably from about 100° to 150° C., in each case a compound of the general formula (I)

$$Q\text{—}[A\text{—}Y]_n \qquad (I)$$

in an amount of about 1 to 20% by weight, preferably about 2.5 to about 10% by weight, in which in the formula (I) mentioned Q is a quinacridone radical which is unsubstituted or substituted by halogen atoms, such as, for example, fluorine or chlorine atoms, alkyl($C_1$-$C_6$), alkoxy($C_1$-$C_6$), $H_2N$—CO—, alkyl($C_1$-$C_8$)—NH—CO— or

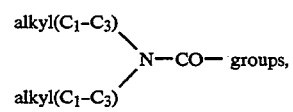

A is a direct bond or a bridge member from the series comprising —O—, —S—, —$NR^1$—, —CO—, —$SO_2$—, —$CR^2R^3$—, arylene, for example phenylene, and chemically reasonable combinations of these bridge members and Y is an —$NR^4R^5$ group or the radical of a five-, six- or seven-membered heterocycle which contains one to three heteroatoms from the series comprising nitrogen and/or oxygen and/or sulfur and can be substituted by alkyl($C_1$-$C_4$), alkoxy($C_1$-$C_6$), hydroxyphenyl, halogen, for example a fluorine, chlorine or bromine atom, —CN, carboxyl, —CO—NRR', —$SO_2$—NRR', saturated or unsaturated hydroxyalkyl or alkylaminoalkyl, in which R and R' together with the nitrogen atom can be an aliphatic or aromatic heterocycle, R and R' are hydrogen atoms or alkyl($C_1$-$C_4$) groups, and $R^1$ to $R^5$, independently of one another, are each a hydrogen atom and/or an alkyl or alkylene group of 1 to 22 carbon atoms, and n is a number from 1 to 4.

Preferably, the compounds used in the process are those of the general formula (I) mentioned, in which Q is a quinacridone radical which is unsubstituted or substituted by alkyl($C_1$-$C_6$) groups or chlorine atoms, A is —$CH_2$—, —$NR^6$—, —$SO_2$—, —CO—, $CR^7R^8$ or chemically reasonable combinations thereof, and Y is an —$NR^9R^{10}$ group or a five-, six- or seven-membered heterocycle which contains one to three hetero atoms from the series comprising nitrogen and/or oxygen and/or sulfur, in which $R^6$ to $R^{10}$ are alkyl($C_1$-$C_6$) groups and n is the number 1 or 2.

When 2,9-dimethylquinacridone or mixed crystal pigments or mixtures of 2,9-dimethylquinacridone and substituted or unsubstituted quinacridones, which have a tendency to form needle-like particles, are prepared, the addition of compounds of the formula I during the pigment preliminary stage, at the latest during the pigment finishing stage, gives quinacridone pigments consisting of almost cubic crystals whose surface properties and properties in practical application differ quite significantly in an advantageous manner from those obtained without addition or addition after the pigment finishing.

Quite significant differences compared to the untreated pigments or pigments treated under the same conditions with unsuitable substances can also be detected in the physical properties.

In the pigments prepared by the process according to the invention, the growth of the crystal needles or rods is affected considerably. The length:width ratio of the crystals is shifted from 4–5:1 to less than 2:1. The surface is considerably larger and the average particle diameter is significantly smaller compared with untreated comparison products and can be controlled by concentrating the compound of the formula I and by the finishing conditions. Thus, the pigments prepared by the process according to the invention have very high transparency of the coating in the pigmenting of all known lacquer systems, which is of great importance for practical purposes, and furthermore a very high color strength and excellent rheological behavior.

The compounds of the formula (I) mentioned are added before the pigment finishing to give the very finely divided low-crystalline or dissolved quinacridones, which are obtained, for example, by the ring closure of 2,5-diphenylaminoterephthalic acids in polyphosphoric acid or esters thereof and hydrolysis or by recrystallization of quinacridones, for example from sulfuric acid, or by dry or wet milling thereof.

The preferred method for preparing the crude quinacridones of the 2,9-dimethylquinacridone pigments according to the invention is the ring closure of the corresponding 2,5-diphenylaminoterephthalic acids in polyphosphoric acid or its monomethyl ester and hydrolysis after ring closure melt with water or water/solvent mixture. The compounds of the formula (I) mentioned can be added during the stage of ring closure, during the hydrolysis of the ring closure melt or, at the latest, to the finishing suspension, for example in alcoholic solvents, before the finishing.

The pigment derivatives can be added not only in dry powder form, for example during the acidic ring closure, the hydrolysis or before the finishing, but also in the form of an water-moist or solvent-moist product during the hydrolysis or before the finishing. Preferably, the pigment derivatives in powder form are added during the ring closure to the acidic ring closure agents or to the finishing suspension before the finishing, and the moist pigment derivatives are added to the finishing suspension.

Depending on the combination of pigment derivative and pigment, the amount of the additive required for obtaining the optimum rheological and coloristic properties is about 0.5 to about 20% by weight, preferably about 2 to about 10% by weight.

Very particularly preferred, the compounds used in the process are those of the general formula (I) mentioned in which Q is a guinacridone radical which is unsubstituted or substituted by alkyl($C_1$-$C_6$) groups or chlorine atoms, A is —$CH_2$—, —NH—, —$SO_2$ or —CO— or a chemically reasonable combination thereof, and Y is a —$NR^{11}R^{12}$ group in which $R^{11}$ and $R^{12}$ are alkyl($C_1$-$C_6$) groups, or is an imidazole, benzimidazole or indole radical, and n is the number 1 or 2.

Particularly important aromatic heterocyclic radicals for Y are imidazole, benzimidazole and indole radicals.

The preparation of the compounds of the general formula (I) mentioned is carried out in a manner known per se. Thus, compounds of the general formula (II)

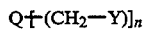

Q—[($CH_2$—Y)]$_n$    (II)

in which Q and n have the abovementioned meanings and Y is the radical of a five-, six- or seven-membered heterocycle which contains one to three hetero atoms from the series comprising nitrogen and/or oxygen and/or sulfur, are prepared by condensation of the corresponding quinacridones with hydroxymethyl heterocycles or with heterocycles in the presence of substances which release formaldehyde, such as, for example, paraformaldehyde, in acidic reaction mediums, such as, for example, sulfuric acid or polyphosphoric acid.

The preparation can also be carried out during the synthesis of the pigment, for example during the ring closure of 2,5-diphenylaminoterephthalic acid to quinacridone in polylphosphoric acid.

Compounds of the general formula (III)

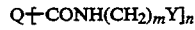

Q—[CONH($CH_2$)$_m$Y]$_n$    (III)

in which Q and n have the meanings mentioned below, Y is the $NR^4R^5$ radical and m is a number from 1 to 6 can be obtained, for example, by condensation of succinylosuccinic esters with the corresponding aminobenzamides, dehydrogenation of the resulting corresponding 2,5-diphenylaminodihydroterephthalic esters and ring closure in acidic medium, either directly or even as an intermediate stage after hydrolysis. Not only the esters but also the acids prepared therefrom can also be added directly to the pigment preparation, for example during the acidic ring closure of the quinacridone preliminary stage.

The preparation of compounds of the general formula (IV)

$$Q\text{-}[SO_2\text{-}NH(CH_2)_mY]_n \qquad (IV)$$

in which Q and n have the meanings mentioned below, Y is the radical —$NR^4R^5$ and m is a number from 1 to 6, can be carried out, for example, by sulfochlorination of the corresponding quinacridones in the presence of thionyl chloride and condensation of the resulting sulfochlorides with the corresponding amines.

In the abovementioned general formulae (III) and (IV), Q is preferably unsubstituted quinacridone or dimethylquinacridone and n is a number from 1 to 2.

The 2,9-dimethylquinacridone mixed crystal pigments are mixed crystals consisting of 2,9-dimethylquinacridone and quinacridones of the general formula (V)

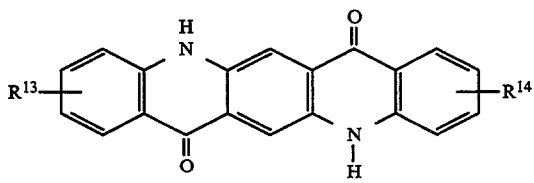

in which $R^{13}$ and $R^{14}$, independently of one another, are hydrogen atoms, halogen atoms, such as, for example, fluorine or chlorine atoms, alkyl($C_1$-$C_6$), alkoxy($C_1$-$C_6$), $H_2N$—CO—, alkyl ($C_1$-$C_8$)—NH—CO— or

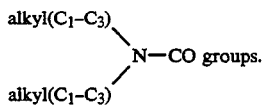

N—CO groups.

The mixed crystals according to the invention are composed of 2,9-dimethylquinacridone and substituted or unsubstituted quinacridones are preferably those which comprise at least 60% by weight of 2,9-dimethylquinacridone, the remainder being unsubstituted quinacridone.

The pigments according to the invention are particularly suitable for the pigmenting of natural or synthetic materials. These high- or higher-molecular-weight materials are, for example, cellulose ethers and esters, such as ethylcellulose, nitrocellulose, cellulose acetate, cellulose butyrate, natural resins or synthetic resins, such as polymerization resins or condensation resins, e.g. amino resins, in particular urea/formaldehyde and melamine/-formaldehyde resins, alkyd resins, acrylic resins, phenolic resins, polycarbonates, polyolefins, such as polystyrene, polyvinyl chloride, polyethylene, polypropylene, polyacrylonitrile, polyacrylic esters, polyamides, polyurethanes or polyesters, rubber, casein, silicone and silicone resins, individually or in mixtures.

It makes no difference whether these higher-molecular-weight organic compounds mentioned are present in the form of plastic materials, melts or in the form of spinning solutions, lacquers, paints or printing inks. Depending on the particular use, it may be advantageous to use the pigments according to the invention as toners or in the form of preparations or dispersions.

Particularly preferred lacquer systems are baking enamels from the class of alkyd melamine resin or acrylic melamine resin lacquers and two-component lacquers based on polyisocyanate-crosslinkable acrylic resins. Of the large number of printing inks, printing inks based on nitrocellulose are particularly suitable.

The pigments according to the invention can be easily and very finely dispersed in many application mediums.

These dispersions have high resistance to flocculation and have excellent rheological properties even in the case of high pigment content. They can be used to prepare coatings and prints of high color strength, high gloss and high transparency in combination with excellent fastness properties.

To test the properties, from the large number of known systems, an alkyd-melamine resin lacquer (AM) based on a medium—oil, non-drying alkyd resin consisting of synthetic fatty acids and phthalic anhydride and a melamine resin etherified with butanol and portions of a non-drying alkyd resin based on ricinenic acid (short-oil) and an acrylic resin baking enamel based on a non-aqueous dispersion (TSA-AND) were selected.

The rheology of the milled material after the dispersion is evaluated by means of the following five-step scale:
5 highly fluid
4 fluid
3 viscous
2 slightly set
1 set After dilution of the milled material to a pigment concentration of 4%, the viscosity of the lacquer was evaluated by means of the "viscospatula" of Rossmann, Type 301, from ERICHSEN.

Gloss measurements were carried out at an angle of 20° according to DIN 67530 (ASTMD 523) by means of a "multigloss" glossimeter from Byk-Mallinckrodt.

To evaluate the coloristic properties, the 4% strength lacquer was applied to a white cardboard printed with a black strip to evaluate the transparency by means of a hand coater No. 8—wet film thickness 100 lm—from RK Print Coat Instruments Ltd. and then baked in an oven at 140° C. for 20 minutes.

In the examples which follow parts are by weight.

EXAMPLE 1 (E1)

135 parts of water-moist crude 2,9-dimethylquinacridone, 27.6% strength, which was obtained by ring closure in polyphosphoric acid and hydrolysis in water, are suspended in 240 parts of 100% pure isobutanol, and the suspension is stirred at 25°-30° C. for 30 minutes. 1.96 parts of (3'-dimethylaminopropyl)quinacridonebissulfonamide are then added as a powder, and the mixture is stirred for 15 minutes. 2.9 parts of 33% strength sodium hydroxide solution and 59 parts of water are then added. The finishing suspension is then heated in a closed vessel to 90° C. and stirred at 90° C. for 1 hour. It is then heated to 115° C. and stirred at 115° C. for 3 hours. The isobutanol is then distilled off and the pigment isolated by filtration.

This gives 38.7 parts of a magenta pigment which has excellent rheological properties.

COMPARATIVE EXAMPLE 1 (CE1A)

Example 1 was repeated without adding the pigment derivative.

COMPARATIVE EXAMPLE 1B (CE1B)

Example 1 was repeated, except that 1.96 parts of (3'-dimethylaminopropyl)quinacridonebissulfonamide were only added after the isobutanol had been distilled off and the mixture was subsequently stirred at 80° C. for another 3 hours.

COMPARATIVE EXAMPLE 1C (CE1C)

Example 1 was repeated, except that 1.96 parts of bis(phthalimidomethyl)quinacridone were added as the quinacridone derivative.

The test in alkyd-melamine resin lacquer AM-L shows that the pigment prepared according to Example 1 has a significantly higher color strength and is much more transparent in the full shade than the pigment obtained in the comparative examples:

| Criterion | E1 | CE1A | CE1B | CE1C |
|---|---|---|---|---|
| Rheology | 5 | 1 | 5 | 1-2 |
| Gloss | 88 | 53 | 86 | 50 |
| Length:width | 1.8:1 | 4.5:1 | 4.5:1 | 2.1:1 |
| Specific surface area | 92 | 71 | 72 | 68 |
| Coloristic properties: | | | | |
| Compared with Comparative Example CE1A: | | | | |
| E1: | Much more transparent, much higher color strength and bluer | | | |
| CE1B: | More transparent, higher color strength, a little bluer | | | |
| CE1C: | Somewhat more transparent, a slightly higher color strength | | | |

EXAMPLE 2

The procedure as described in Example 1 is repeated, except that the solvent treatment is carried out at 150° C. for 3 hours, to give a magenta pigment which is somewhat more hiding than the product obtained according to Example 1.

| Criterion: | Example 1 | Example 2 |
|---|---|---|
| Rheology | 5 | 5 |
| Gloss | 88 | 87 |
| Length:width | 1.8:1 | 1.8:1 |
| Specific surface area $m^2/g$ | 92 | 72 |
| $D_{50}$ (micrometers) | 0.057 | 0.074 |
| Coloristic properties: | significantly more transparent, significantly higher color strength, somewhat bluer than Example 2 | |

EXAMPLE 3

50 parts of 2,5-di(4'-methylphenylamino)terephthalic acid are stirred into 150 parts of polyphosphoric acid ($P_2O_5$ concentration: 83%) at 125° C. over a period of 1 hour with stirring, and the mixture is stirred for 2 hours. The acidic quinacridone solution is then hydrolyzed in 600 parts of water at 20° C. in which 1.25 parts of a condensation product of unsubstituted quinacridone and 4-methyl-5-hydroxymethylimidazole in a molar ratio of 1:2 are suspended. The water-moist crude quinacridone isolated is suspended in 270 parts of isobutanol and 6.6 parts of 33% strength sodium hydroxide solution, and the mixture is then stirred at 150° C. in a closed vessel for 3 hours. The isobutanol is then distilled off, and another 1.25 parts of the condensation product described above is added to the pigment suspension. It is then stirred at 50° C. for another 2 hours, and the pigment is isolated.

45 parts of a highly transparent magenta pigment which has excellent rheological properties are obtained.

For comparison, a pigment was prepared without adding the quinacridone derivative during the hydrolysis. After the isobutanol has been separated off, 2.5 parts of the abovementioned condensation product are added.

45 parts of a magenta pigment which is considerably more hiding than the pigment obtained according to Example 2 are obtained.

| Criterion: | Example 3 | Comparative Example 3A |
|---|---|---|
| Rheology | 5 | 5 |
| Gloss | 86 | 83 |
| Length:width | 1.9:1 | 4.5:1 |
| Coloristic properties: | significantly more transparent, higher color strength, slightly bluer than Example 3A | |

EXAMPLE 4

A mixture of 85 parts of 2,5-di(4'-methylphenylamino)terephthalic acid and 15 parts of 2,5-diphenylaminoterephthalic acid is cyclized at 125° C. in 300 parts of monomethyl polyphosphate ($P_2O_5$ concentration: 81%). After hydrolysis of the ring closure melt in 1,200 parts of water at 20° C. in which 5 parts of (3'-dimethylaminopropyl) quinacridonebissulfonamide had been suspended, the crude quinacridone isolated was subjected to a solvent finish at 125° C.

92.5 parts of a highly transparent rheologically excellent magenta pigment were obtained.

Comparative Example 4A

Example 4 was repeated without adding the pigment derivative.

| Criterion | Example 4 | Comparative Example 4A |
|---|---|---|
| Rheology | 5 | 1-2 |
| Gloss | 92 | 58 |
| Length:width | 1.5:1 | 3.2:1 |
| $D_{50}$ (micrometers) | 0.048 | 0.061 |
| Coloristic properties: | significantly more transparent, significantly higher color strength, somewhat bluer than Example 4A | |

EXAMPLE 5

7.5 parts of a condensation product of unsubstituted quinacridone, chloroacetamide, paraformaldehyde and 3-aminopropylimidazole are dissolved, as described in German Offenlegungsschrift 2,500,509, in 300 parts of polyphosphoric acid (83% $P_2O_5$).

95 parts of 2,5-di(4'-methylphenylamino)terephthalic acid are then stirred in at 125° C., and the mixture is stirred for 2 hours. The solution is then hydrolyzed, and the water-moist crude quinacridone isolated is refluxed, after the addition of dimethylformamide, for 3 hours.

The pigment is then isolated by filtration, washed with water and dried is obtained.

A transparent magenta pigment which has excellent rheological properties is obtained.

Comparative Example 5A

Example 5 is repeated without adding the pigment derivative.

| Criterion: | Example 5 | Comparative Example 5A |
|---|---|---|
| Rheology | 5 | 1–2 |
| Gloss | 88 | 39 |
| Length:width | 1.9:1 | 5:1 |
| Specific surface area m²/g | 85 | 57 |
| Coloristic properties: | significantly more transparent, higher color strength, somewhat bluer than Example 5A | |

We claim:

1. A process for the preparation of a 2,9-dimethylquinacridone pigment composition comprising: (a) 2,9-dimethylquinacridone pigment of the formula I

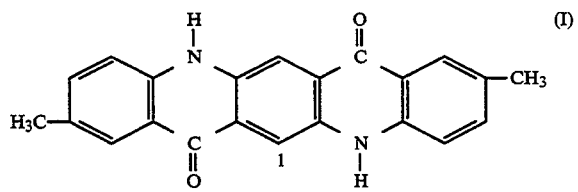

which has been obtained in a ring closure of 2,5-di(4'-methylphenylamino)terephthalic acid that was carried out in polyphosphoric acid or an ester thereof, or (b) a mixed crystal of said pigment of formula (I) and a quinacridone which is unsubstituted or substituted in accordance with formula (II)

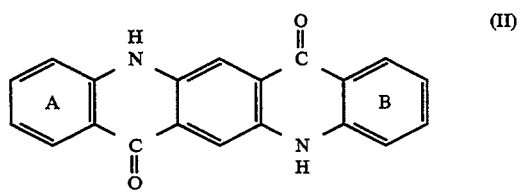

wherein the annellated benzene nuclei A and B are unsubstituted or substituted by 1 or 2 substituents selected from halogens, alkyl ($C_1$–$C_6$), alkoxy ($C_1$–$C_6$), $H_2N$—CO—, alkyl ($C_1$–$C_8$)—NH—CO or [alkyl(-$C_1$–$C_3$)]$_2$N—CO—, or (c) a mechanical mixture of said 2,9-dimethylquinacridone and said substituted or unsubstituted quinacridone, comprising the step of:

adding a compound, in an amount of about 1% to 20% by weight, a) to a ring closure solution of a precursor 2,5-diphenylaminoterephthal, in polyphosphoric acid or an ester thereof, or b) during the hydrolysis of the ring closure melt of said step a) or c) before or during the finishing of the corresponding crude quinacridones in water or solvent mixtures at temperatures ranging from 60° C. to 200 ° C., or d) to the acidic solution and before or during the finishing process, or e) to the acidic solution and before and during the finishing process, said compound having the general formula (III)

wherein

Q is a quinacridone radical which is unsubstituted or substituted by halogen atoms, alkyl ($C_1$–$C_6$), alkoxy ($C_1$–$C_6$), $H_2N$—CO—, alkyl($C_1$–$C_8$)—NH—CO— or [alkyl($C_1$–$C_3$)]$_2$N—CO, A is a direct bond, —O—$CR^2R^3$, O—arylene—, —S—$CR^2R^3$—, —S—arylene—, —CO—$NR^1$—$CR^2R^3$—, —$SO_2$—$NR^1$—$CR^2R^3$—, —$NR^1$—$CR^2R^3$—, —CO—$NR^1$—arylene—, —$SO_2$—$NR^1$—arylene—, —$CR^2R^3$, and Y is an $NR^4R^5$ group or the radical of a five-, six- or seven-membered heterocycle which contains one to three hetero atoms from the group consisting of nitrogen, oxygen, or sulfur, or mixtures thereof and can be substituted by alkyl ($C_1$–$C_4$), alkoxy ($C_1$–$C_6$), hydroxyphenyl, halogen, —CN, carboxyl, —CO—NRR', —$SO_2$—NRR', saturated or unsaturated hydroxyalkyl or alkylaminoalkyl, in which R and R' together with the nitrogen atom can be an aliphatic or aromatic heterocycle, R and R' are hydrogen atoms or alkyl ($C_1$–$C_6$), groups and $R^1$ to $R^5$, independently of one another, are each a hydrogen atom, an alkyl or alkylene group of 1 to 22 carbon atoms, or mixtures thereof, and n is a number from 1 to 4, wherein the resulting said 2,9-dimethylquinacridone pigment, or said mixed crystal pigment of said 2,9-dimethylquinacridone and said substituted or unsubstituted guinacridone, or a mechanical mixture thereof have crystalline particles with an average ratio of length to width of <2:1, and an average particle size of <0.4 μm.

2. The process of claim 1, wherein said Q is an quinacridone radical which is unsubstituted or substituted by alkyl ($C_1$–$C_6$) groups or chlorine atoms, A is a direct bond, —O—$CR^2R^3$, —O—arylene—, —S—$CR^2R^3$—, —S—arylene—, —CO—$NR^1$—$CR^2$—$R^3$—, $SO_2$—$NR^1$—$CR^2R^3$—, —$NR^1$—$CR^2R^3$—, —CO—$NR^1$—arylene—, —$SO_2$—$NR^1$—arylene—, —$CR^2R^3$, and Y is an —$NR^9R^{10}$ group or a five-, six- or seven-membered heterocycle which contains one to three hetero atoms from the series comprising nitrogen, oxygen, or sulfur, or mixtures thereof, in which $R^9$ to $R^{10}$ are alkyl ($C_1$–$C_6$) groups and n is the number 1 or 2.

3. The process of claim 1, wherein said benzene rings A and B are substituted by identical substituents.

4. The process of claim 3, wherein said identical substituents are substituted on the identical position of benzene rings A and B.

5. The process of claim 3, wherein said identical substituents are substituted on differing positions of said benzene rings A and B.

6. A 2,9-dimethylquinacridone pigment composition made by the process of claim 1.

7. A 2,9-dimethylquinacridone pigment composition comprising: (a) pigment of the formula (I)

or (b) a mixed crystal of said pigment of formula (I) and a quinacridone which is unsubstituted or substituted in accordance with formula (II)

(II)

wherein the annellated benzene nuclei A and B are unsubstituted or substituted by 1 or 2 substituents selected from halogens, alkyl ($C_1$-$C_6$), alkoxy ($C_1$-$C_6$), $H_2N$—CO—, alkyl ($C_1$-$C_8$)—NH—CO or [alkyl($C_1$-$C_3$)]$_2$N—CO—, or (c) a mechanical mixture of said 2,9-dimethylquinacridone and said substituted or unsubstituted quinacridone, wherein said 2,9-dimethylquinacridone pigment or said mixed crystal pigment of said 2,9-dimethylquinacridone and said substituted or unsubstituted quinacridone, or a mechanical mixture thereof have crystalline particles with an average ratio of length to width of <2:1, and an average particle size of <0.4 μm, and contain from about 1% to about 20% by weight of a compound of the general formula (III)

 (III)

wherein

Q is a quinacridone racial which is unsubstituted or substituted by halogen atoms, alkyl ($C_1$-$C_6$), alkoxy ($C_1$-$C_6$), $H_2N$—CO—, alkyl ($C_1$-$C_8$)—NH—CO— or [alkyl($C_1$-$C_3$)]$_2$N—CO—, A is a direct bond, —O—$CR^2R^3$, —O—arylene—, —S—$CR^2R^3$—, —S—arylene—, —CO—$NR^1$—$CR^2$—$R^3$—, —$SO_2$—$NR^1$—$CR^2R^3$—, —$NR^1$—$CR^2R^3$—, —CO—$NR^1$—arylene—, —$SO_2$—$NR^1$—arylene—, —$CR^2R^3$, and Y is an $NR^4R^5$ group or the radical of a five, six- or seven-membered heterocycle which contains one to three hetero atoms from the group consisting of nitrogen, oxygen, or sulfur, or mixtures thereof and can be substituted by alkyl ($C_1$-$C_4$), alkoxy ($C_1$-$C_6$), hydroxyphenyl, halogen, —CN, carboxyl, —CO—NRR', —$SO_2$—NRR', saturated or unsaturated hydroxyalkyl or alkylaminoalkyl, in which R and R' together with the nitrogen atom can be an aliphatic or aromatic heterocycle, R and R' are hydrogen atoms or alkyl ($C_1$-$C_4$) groups and $R^1$ to $R^5$, independently of one another, are each a hydrogen atom, an alkyl or alkylene group of 1 to 22 carbon atoms, or mixtures thereof, and n is a number from 1 to 4.

8. A method for pigmenting natural or synthetic materials comprising the step of pigmenting the said materials with a quinacridone pigment of claim 7.

9. A method for pigmenting lacquer systems comprising the step of pigmenting the said systems with a quinacridone pigment of claim 7.

10. A 2,9-dimethylquinacridone pigment composition comprising: (a) pigment of the formula (I)

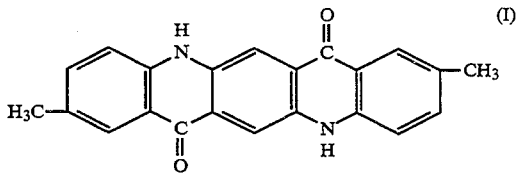

(I)

or (b) a mixed crystal of said pigment of formula (I) and a quinacridone which is unsubstituted or substituted in accordance with formula (II)

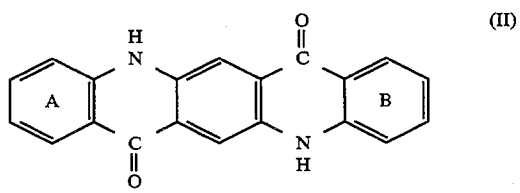

(II)

wherein the annellated benzene nuclei A and B are unsubstituted or substituted by 1 or 2 substituents selected from halogens, alkyl ($C_1$-$C_6$), alkoxy ($C_1$-$C_6$), $H_2N$—CO—, alkyl ($C_1$-$C_8$)—NH—CO or [alkyl($C_1$-$C_3$)]$_2$N—CO—, or (c) a mechanical mixture of said 2,9-dimethylquinacridone and said substituted or unsubstituted guinacridone, wherein said 2,9-dimethylquinacridone pigment or said mixed crystal pigment of said 2,9-dimethylquinacridone and said substituted or unsubstituted quinacridone, or a mechanical mixture thereof have crystalline particles with an average ratio of length to width of <2:1, and an average particle size of <0.4 μm, and contain from about 1% to about 20% by weight of a compound of the general formula (III)

 (III)

wherein

Q is a quinacridone radical which is unsubstituted or substituted by halogen atoms, alkyl ($C_1$-$C_6$), alkoxy ($C_1$-$C_6$), $H_2N$—CO—, alkyl ($C_1$-$C_8$)—NH—CO— or [alkyl($C_1$-$C_3$)]$_2$N—CO—, A is a direct bond, —O—$CR^2R^3$, —O—arylene—, —S—$CR^2R^3$—, —S—arylene—, —CO—$NR^1$—$CR^2$—$R^3$—, —$SO_2$—$NR^1$—$CR^2R^3$—, —$NR^1$—$CR^2R^3$—, —CO—$NR^1$—arylene—, —$SO_2$—$NR^1$—arylene—, —$CR^2R^3$, and Y is an $NR^4R^5$ group or the radical of a five-, six- or seven-membered heterocycle which contains one to three hetero atoms from the group consisting of nitrogen, oxygen, or sulfur, or mixtures thereof, in which $R^1$ to $R^5$ are alkyl ($C_1$-$C_6$) groups and n is the number 1 or 2.

* * * * *